March 29, 1927.  
P. H. LETTRÉ  
LINE SPLICING DEVICE  
Filed July 9, 1926

1,622,324

Inventor  
Philip H. Lettré,

By Clarence A. O'Brien  
Attorney

UNITED STATES PATENT OFFICE.

PHILIP H. LETTRÉ, OF NORTH ATTLEBORO, MASSACHUSETTS.

LINE-SPLICING DEVICE.

Application filed July 9, 1926. Serial No. 121,387.

This invention relates to splicing devices, primarily, though not necessarily adapted for interconnecting the ends of clothes lines, the primary object of the invention residing in the provision of a single member that is so constructed as to permit the rapid securing of the ends of the line, and also to permit the line to be tightened or loosened to the desired degree.

A still further object is to provide a device of this character that is extremely simple of construction and one that is so constructed as to rigidly maintain the ends of the line connected, and this without any liability of the same slipping.

Other objects will become apparent as the nature of the invention is better understood, the same comprising the novel form of device hereinafter more fully described, shown in the accompanying drawing and claimed.

In the drawing wherein like reference characters indicate corresponding parts in both of the views.

Figure 1:
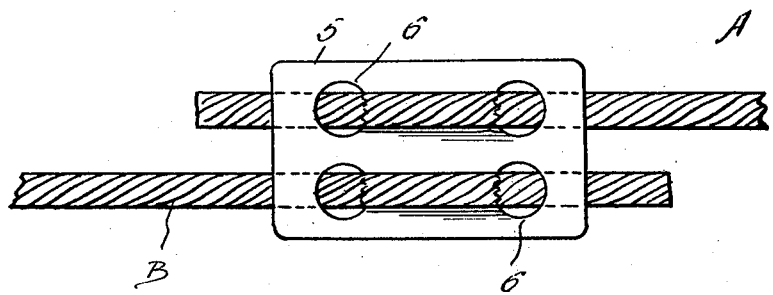
Figure 1 is a top plan view of my line splicing device shown in actual use.
Figure 2:
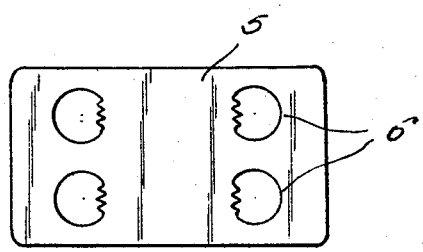
Figure 2 is a top plan view of the device, per se.

Now having particular reference to the drawing, there is disclosed a device that constitutes the provision of a substantially rectangular shaped plate 5 of rigid material preferably metal that is formed adjacent its longitudinal edges, and at its opposite ends with openings 6, the same being formed at their inner sides with biting teeth 7.

In actual use, one end A of the clothes line is passed through one of the openings at one end of the plate and then extended across the top of the plate and then passed downwardly through the longitudinally aligned opening at the opposite end and then extended longitudinally therefrom as disclosed. The opposite end B of the line is similarly engaged through the openings at the opposite longitudinal edge of the plate, and it will be obvious that by so manipulating the ends of the line as to extend the same through the longitudinally aligned openings in the plate, the line will be tightened and the ends thereof connected. By reason of the teeth 7 at the inner sides of the opening, the ends of the line will be frictionally maintained against movement in a displaceable direction.

It will thus be seen that I have provided a highly novel, simple, and efficient form of line splicing device that is well adapted for all the purposes heretofore designated.

Having thus described the invention, what I claim as new and desire to secure by Letters Patent is:—

In a line splicing device of the class described, a flat plate member of substantially rectangular shape, said plate being formed with spaced pairs of longitudinally aligned end receiving openings, teeth formed at the inner opposed sides of the longitudinally aligned openings, one end of the line adapted to pass through one pair of longitudinally aligned openings, the adjacent end of the line passing through the other pair of longitudinally aligned openings, said teeth biting into the respective end portions of the line for securing the same against displacement from the openings.

In testimony whereof I affix my signature.

PHILIP H. LETTRÉ.